US006992964B2

(12) United States Patent
Takehara et al.

(10) Patent No.: US 6,992,964 B2
(45) Date of Patent: Jan. 31, 2006

(54) INFORMATION REPRODUCING DEVICE AND INFORMATION REPRODUCING METHOD

(75) Inventors: Shintaro Takehara, Yokohama (JP); Yutaka Kashihara, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 216 days.

(21) Appl. No.: 10/382,985

(22) Filed: Mar. 7, 2003

(65) Prior Publication Data

US 2003/0174621 A1 Sep. 18, 2003

(30) Foreign Application Priority Data

Mar. 8, 2002 (JP) ............................ 2002-064354

(51) Int. Cl.
*G11B 7/005* (2006.01)

(52) U.S. Cl. .............................. 369/59.22; 369/47.35; 369/53.35

(58) Field of Classification Search ............ 369/59.22, 369/47.35, 53.35, 59.15, 47.25
See application file for complete search history.

(56) References Cited

U.S. PATENT DOCUMENTS 5,661,709 A * 8/1997 Takagi et al. ............ 369/59.22
6,477,125 B1 * 11/2002 Hayami ................... 369/59.22
6,704,259 B2 3/2004 Kashihara et al.
2003/0151988 A1 * 8/2003 Katayama ................ 369/44.32
2003/0169665 A1 * 9/2003 Miyashita et al. ....... 369/59.22
2003/0174621 A1 9/2003 Takehara et al.
2003/0227842 A1 * 12/2003 Shim et al. .............. 369/47.26
2004/0202081 A1 * 10/2004 Shim ....................... 369/59.22

FOREIGN PATENT DOCUMENTS

JP 6-4810 1/1994
JP 6004810 1/1999
JP 2000-15515 1/2000
JP 2000015515 1/2000

* cited by examiner

*Primary Examiner*—Brian E. Miller
*Assistant Examiner*—Michael V. Battaglia
(74) *Attorney, Agent, or Firm*—Pillsbury Winthrop Shaw Pittman, LLP

(57) ABSTRACT

There is provided an information reproducing device which outputs an equalization signal P by applying equalization processing to a signal detected from a storage medium based on equalization coefficients $C_0$ to $C_N$, outputs a decoding signal d by applying maximum likelihood decoding processing based on reference levels $R_0$ to $R_6$, generates an ideal waveform signal I based on the equalization signal, and has a target waveform generator which generates a target waveform signal T by changing at least one level of the ideal waveform signal I, wherein erroneous decoding is reduced by optimizing reproduction processing parameters such as the equalization coefficients $C_0$ to $C_N$ or the reference levels $R_0$ to $R_6$ based on the target waveform signal T and the information on the storage medium is stably reproduced.

20 Claims, 10 Drawing Sheets

INFORMATION REPRODUCING DEVICE AND INFORMATION REPRODUCING METHOD

CROSS-REFERENCE TO RELATED APPLICATIONS

This application is based upon and claims the benefit of priority from the prior Japanese Patent Application No. 2002-064354, filed Mar. 8, 2002, the entire contents of which are incorporated herein by reference.

BACKGROUND OF THE INVENTION

1. Field of the Invention

The present invention relates to an information reproducing device, and more particularly to an information reproducing device and an information reproducing method which perform decoding processing by using a PRML (Partial Response and Maximum Likelihood) method.

2. Description of the Related Art

Recently, there has been widely spread an information recording/reproducing device that performs a recording and reproducing process to a storage medium, e.g., an optical disk such as a DVD (Digital Versatile Disc), and the higher recording density with various methods has been demanded. With respect to this, for example, as a method of recording and reproducing process of an optical disk or the like, there is a PRML method.

That is, if the recording density becomes higher at the time of recording/reproducing information on a storage medium, a mark with a desired size can not be recorded due to an affect of the thermal interference when recording a shortest mark or a shortest space in a recording mode. Further, in reproduction, since the recorded shortest mark or shortest space is small, the waveform interference further affects, and an amplitude corresponding to the shortest mark/space becomes consequently small. That is, the shortest mark/space which is smaller than the desired size is formed in recording, and the amplitude corresponding to the shortest mark becomes small due to the affect of the waveform interference in the reproduction mode.

On the other hand, in a Viterbi algorithm which is the PRML method, the linearity is not necessarily demanded to the shortest mark/shortest space. Giving explanation taking an RLL (1, k) modulation method as an example, the shortest mark/shortest space is 2T in this modulation method. 1T is not allowed in a state transition diagram of FIG. 6 of the Viterbi algorithm determined by the modulation method. That is, a 2T signal level does not necessarily have to match with a 2T ideal signal level, and allows identification.

As a cited reference disclosing this PRML method, there is Jpn. Pat. Appln. KOKAI Publication No. 6-4810, in which the convolution integration of a decoding result and a PR (Partial Response) class is carried out in order to obtain an ideal waveform, an equalization error between the ideal waveform and an equalizer output is calculated and reproduction signal processing parameters (for example, a tap coefficient, a gain, an offset and the like of an equalizer) are changed by using an LMS (Least Mean Square) algorithm so as to minimize the equalization error.

When the recording density is improved, however, the shortest mark/space is generally hard to be formed, and in fact the shortest mark/space is formed with a smaller length than the desired length. According to the state transition diagram of a Viterbi decoder in FIG. 6, however, since a code of a length not more than the shortest mark/space is not admitted, a decoding error hardly occurs even if a value of a level corresponding to the shortest mark/space among levels of an actual reproduction signal is shifted in a direction to reduce the amplitude as compared with the ideal waveform.

Thus, as the recording density is increased, for example, when a tap coefficient of the equalizer is calculated by using the LMS algorithm so as to minimize the above-described equalization error, there is disadvantageously outputted an equalization coefficient amplified on a higher frequency side than the equalization coefficient of the equalizer which is required in the Viterbi decoder. As a result, the noise is amplified more than necessary, and the decoding error can not be consequently satisfactorily reduced.

That is, in this prior art, even if the recording density is increased and the amplitude of a response waveform corresponding to the shortest mark/shortest space becomes small, there is generated a tap coefficient of an FIR (Finite Impulse Response) filter having an equalizer characteristic which forcibly increases the gain on the high frequency side so as to increase the amplitude of the shortest mark/shortest space after equalization.

As a result, since equalization close to the 2T signal level of the ideal waveform is performed beyond the 2T signal level which is required in the Viterbi decoding processing, there is generated the equalization coefficient having the characteristic of the gain larger than that required in the Viterbi decoding processing in a high frequency band. There is, therefore, a problem that the noise is unnecessarily amplified and the decoding error can not be satisfactorily reduced.

BRIEF SUMMARY OF THE INVENTION

It is an embodiment of the present invention to provide an information reproducing device which can stably reproduce information recorded with the high density by optimizing reproduction processing parameters such as a filter coefficient of an equalizer in order to obtain an optimum equalization waveform demanded in Viterbi decoding processing.

To achieve this aim, according to one embodiment of the present invention, there is provided an information reproducing device which reproduces information recorded on a storage medium, comprising: detecting section for detecting information recorded on the storage medium and outputting a detection signal; converting section for converting the detection signal outputted by the detecting section into a digital signal; correcting section for correcting the digital signal converted by the converting section in accordance with a parameter; equalizing section for applying partial response equalization processing to the corrected digital signal corrected by the correcting section based on a predetermined coefficient and outputting an equalization signal; maximum likelihood decoding section for applying maximum likelihood decoding processing to the equalization signal outputted by the equalizing section based on a reference level and outputting a decoding signal; an ideal waveform generating section for generating and outputting an ideal waveform signal in accordance with the equalization signal outputted from the equalizing means; a target waveform generating section for generating and outputting a target waveform signal which can be a target of the equalizing section by changing at least one level in respective levels of the ideal waveform signal outputted by the ideal waveform generating means; and optimizing section for calculating an error between the target waveform signal outputted by the target waveform generating section and the equalization signal outputted by the equalizing section and optimizing at least one of the parameter of the correcting means, the predetermined coefficient of the equalizing section and the reference level of the maximum likelihood decoding section so as to minimize the error.

The present invention generates and outputs a target waveform signal T which can be a target of the equalizing section by changing a level corresponding to a shortest mark/space in a plurality of levels of an ideal waveform signal, for example, as shown in FIG. 5. Furthermore, by optimizing reproduction processing parameters such as a tap coefficient of the FIR filter by using a target waveform signal T, it is possible to eliminate a problem of unnecessary amplification of the noise and occurrence of a decoding error by performing equalization close to a 2T signal level of the ideal waveform beyond the 2T signal level required in the Viterbi decoding processing, which has appeared in the prior art information reproducing device.

It is to be noted that a target of optimization in the present invention is the reproduction processing parameters and it is not restricted to the tap coefficient of the FIR filter. For example, parameters or the like such as a reference level of the Viterbi decoding processing, an amplitude or an offset value of a digital signal detected from a storage medium can be a target.

DETAILED DESCRIPTION OF THE INVENTION

An information reproducing device and an information reproducing method according to one embodiment of the present invention will be described in detail hereinafter taking an optical disk recording/reproducing device as an example with reference to the accompanying drawings. Incidentally, although description is given as to an example of the optical disk recording/reproducing device in this embodiment, a target storage medium is not restricted to the optical disk, and the equivalent effects and advantages can be produced based on the equivalent principle as long as it is a storage medium, e.g., a magneto-optical disk.

<First Embodiment>

A first embodiment provides an information reproducing device and an information reproducing method with decoding errors reduced by generating a target waveform signal T and optimizing reproduction processing parameters in accordance with the generated signal.

<Structure of Optical Disk Device According to Invention>

Figure 1:
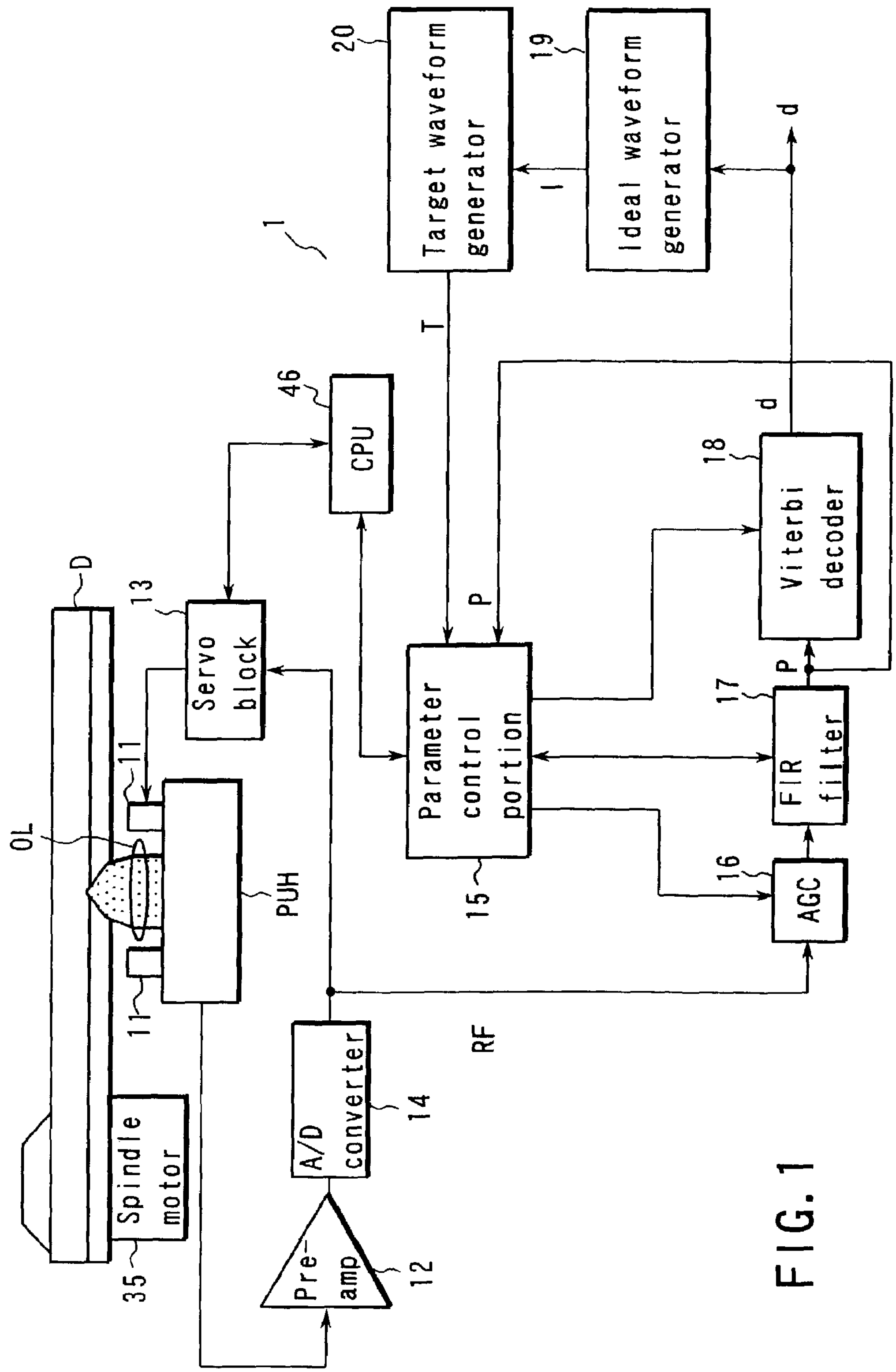
FIG. 1 is a block diagram showing an example of a primary part of an information reproducing device according to one embodiment of the present invention.
Figure 2:
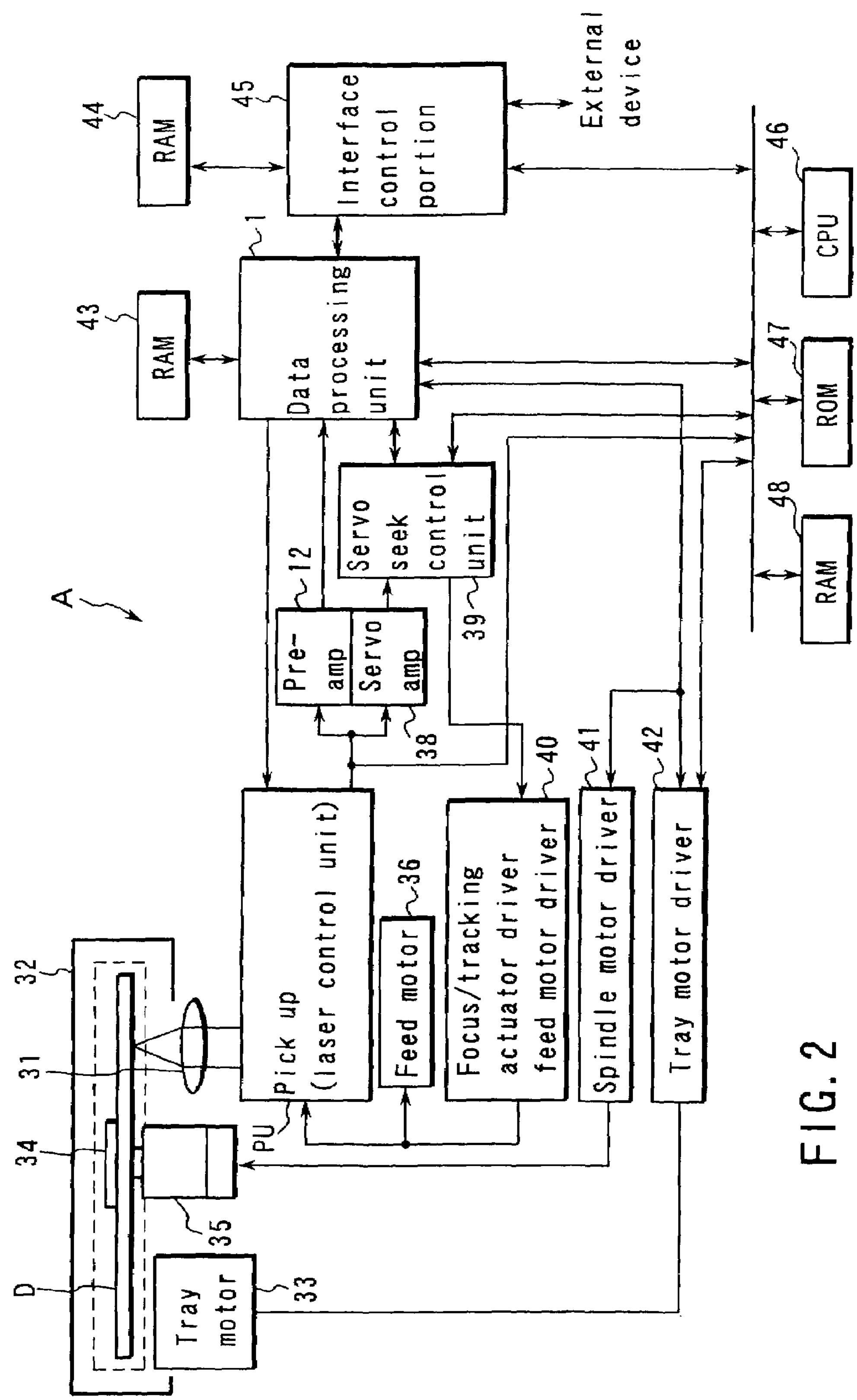
FIG. 2 is a block diagram showing an example of the information reproducing device according to one embodiment of the present invention.

FIG. 1 is a block diagram showing an example of a primary part of an information reproducing device according to one embodiment of the present invention, and FIG. 2 is a block diagram showing an example of its entire structure.

(Basic Structure of Optical Disk Device)

In FIG. 2, an optical disk device A according to one embodiment of the present invention performs data recording or data reproduction with respect to an optical disk D. The optical disk device A has a tray 32 which carries the optical disk D accommodated in a disk cartridge, a motor 33 which drives this tray, a clamper 34 which holds the optical disk D, and a spindle motor 35 which rotates the optical disk D held by the clamper 34 at a predetermined number of revolutions. Moreover, a CPU 46 which executes the entire operation control as a control portion, a ROM 47 which stores therein a basic program or the like for this control operation and a RAM 48 which rewritably stores each control program or application data and the like are connected to each other through a control bus. In addition, a feed motor 36 which carries a pick up PU, a focus/tracking actuator driver/feed motor driver 40 which performs focusing or tracking control of the pick up, a spindle motor driver 41 which drives the spindle motor 35, and a tray motor driver 42 which drives the tray motor are respectively provided and connected to a control portion such as the CPU 46.

Additionally, there are provided a pre-amplifier 12 which is connected to a pick up head PUH and amplifies a detection signal and a servo seek control unit 39 which supplies a seek signal used to perform a seek operation to the driver. Further, there are provided a data processing unit 1 which is connected to the pick up head PUH, the pre-amplifier 12, the servo seek control unit 39 and others, and a RAM 43 which stores therein data used for various kinds of processing. In order to transmit/receive a signal from the data processing unit 1 with respect to an external device, an interface control portion 45 is provided together with a RAM 44.

In such an optical disk device, the present invention supplies an optimum equalization signal demanded by Viterbi decoding processing by providing the data processing unit 1 including such a structure as shown in FIG. 1. That is, a target waveform signal T is generated from an ideal signal I, and parameters for reproduction processing such as a tap coefficient of an FIR filter are optimized based on the generated signal. As a result, it is possible to eliminate a problem of unnecessary amplification of the noise and occurrence of a decoding error by performing equalization close to a 2T signal level of an ideal waveform beyond the 2T signal level required in the Viterbi decoding processing which appears in the prior art device.

(Basic Operation of Optical Disk Device)

The optical disk device provided in the embodiment of the present invention having such a structure performs reproduction processing and recording processing of an optical disk as described below. That is, when the optical disk D is loaded in the optical disk device A, control information of the optical disk D recorded in a control data zone in an embossed data zone in a read-in area of the optical disk D is read and supplied to the CPU 46.

In the optical disk A according to one embodiment of the present invention, energization is performed by a non-illustrated laser control unit and a laser beam is generated under control of the CPU 46 based on operation information by an operation of a user, the control information of the optical disk D recorded in the control data zone in the optical disk, a current status and others.

The generated laser beam is converged by an object lens 31 and a recording area of the disk is irradiated with this laser beam. As a result, data is recorded in the recording area of the optical disk D (generation of a mark row: data is recorded on the optical disk D based on a distance between marks with variable lengths and a length of each mark with a variable length), or the light having the intensity corresponding to the stored data is reflected and this reflection is detected, thereby reproducing this data.

In FIG. 2, although settings of the laser control unit included in the pick up head are set by the data processing unit 1, the settings vary depending on a reproduction power to obtain a reproduction signal RF, a recording power to record data and an erasing power to erase data. The laser beam has powers of different levels, i.e., the reproduction power, the recording power and the erasing power, and the semiconductor laser unit is energized by the laser control unit so as to generate a laser beam having each power.

This laser control unit is constituted by a non-illustrated resistance and a transistor, and a power supply voltage is applied to the resistance, the transistor and a semiconductor laser as the semiconductor laser unit. As a result, an amplitude factor differs depending on a base current of the transistor, a different current flows through a semiconductor laser oscillator, and a laser beam with a different intensity is generated. Here, recording waveform compensation is carried out in accordance with a characteristic of each optical disk, a laser power is generated in accordance with a recording waveform pulse W outputted from a recording waveform generation circuit 11, and recording processing is performed to the optical disk.

Furthermore, the optical disk D is carried into the device by the tray 32 directly or after being accommodated in a disk cartridge in such a manner that the optical disk D is arranged so as to be opposed to the object lens 31. A tray motor 33 used to drive the tray 32 is provided in the device. Moreover, the loaded optical disk D is rotatably held on the spindle motor 35 by the clamper 34, and rotated at a predetermined number of revolutions by the spindle motor 35.

The pick up head PUH has therein a photo-detector (not shown) which detects a laser beam. This photo-detector detects a laser beam which has been reflected on the optical disk D and returned through the object lens 31. A detection signal from the photo-detector (current signal) is converted into a voltage signal by a current/voltage converter (I/V), and this signal is supplied to the pre-amplifier 12 and the servo amplifier 34. A signal for reproducing data in a header portion and a signal for reproducing data in the recording area are outputted from the pre-amplifier 12 to the data processing unit 1. A servo signal (a track error signal, a focus error signal) from the servo amplifier 34 is outputted to the servo seek control unit 39.

Here, as a method of optically detecting a quantity of focusing displacement, there are the following astigmatic method, a knife edge method and the like, for example.

That is, the astigmatic method is a method which arranges an optical element (not shown) which generates astigmatism in a detection light path of a laser beam reflected on a light reflection film layer or a light reflective recording film of the optical disk D and detects a change in shape of the laser beam with which the photo-detector is irradiated. A light detection area is diagonally divided into four. A difference in diagonal sum is taken with respect to the detection signal obtained from each detection area in the servo seek control unit 39, and a focus error detection signal (focus signal) is obtained.

The knife edge method is a method which arranges a knife edge which partially asymmetrically prevents a laser beam reflected on the optical disk D. The light detection area is divided into two, and a difference between detection signals obtained from the respective detection areas is taken, thereby obtaining a focus error detection signal.

Usually, either the astigmatic method or the knife edge method is adopted.

The optical disk D has a spiral or concentric track, and information is recorded on the track. A condensing spot is traced along this track, and reproduction or recording/erasing of information is carried out. In order to stably trace the condensing spot along the track, a relative positional displacement of the track and the condensing spot must be optically detected.

As a track displacement detection method, there are generally the following differential phase detection method, the push-pull method, the twin-spot method and others.

The differential phase detection method detects a change in intensity distribution of a laser beam on the photo-detector, which has been reflected on the light reflection film layer or the light reflective recording film of the optical disk D. The light detection area is diagonally divided into four. A phase difference between diagonal sums is taken in the servo seek control unit 39 with respect to the detection signal obtained from each detection area, and a track error detection signal (tracking signal) is obtained.

In the push-pull method, namely, in this method, a change in intensity distribution of a laser beam on the photo-detector, which has been reflected on the optical disk D, is detected. The light detection area is divided into two, a difference between detection signals obtained from the respective detection areas is taken, and a track error signal is obtained.

The twin-spot method performs wavefront division of the light into a plurality of beams by arranging a diffraction element or the like in a light sending system between the semiconductor laser element and the optical disk D, and detects a change in quantity of reflected light of ±1st diffraction ray with which the optical disk D is irradiated. A light detection area in which a quantity of reflected light of +1st diffraction ray and a quantity of reflected light of −1st diffraction ray are individually detected is arranged separately from the light detection area for detection a reproduction signal, and a difference between the respective detection signals is taken, thereby obtaining a track error signal.

By such focus control and track control, the focus signal, the tracking signal and the feed signal are supplied from the servo seek control unit 39 to the focus and tracking actuator driver and the feed motor driver 40, and the object lens 31 is subjected to focus servo control and the tracking servo control by the driver 40. In addition, an energization signal is supplied from the driver 40 to the feed motor 36 in accordance with an access signal, and the pick up head PUH is subjected to carriage control.

Additionally, the servo seek control unit 39 is controlled by the data processing unit 1. For example, the access signal is supplied from the data processing unit 1 to the servo seek control unit 39, and the feed signal is generated.

Further, the spindle motor driver 41 and the tray motor driver 42 are controlled based on a control signal from the data processing unit 1, the spindle motor 35 and the tray motor 33 are energized, the spindle motor 35 is rotated at a predetermined number of revolutions, and the tray motor 33 can appropriately control the tray.

A reproduction signal RF corresponding to data of the header portion supplied to the data processing unit 1 is fed to the CPU 46. A sector number as an address of the header portion is judged based on the reproduction signal RF and compared with a sector number as an address to be accessed (data is recorded or recorded data is reproduced).

As to the reproduction signal RF corresponding to data in the recording area supplied to the data processing unit 1, necessary data is stored in the RAM 48, the reproduction signal RF is processed in the data processing unit 1 and supplied to the interface control portion 45, and a reproduction processing signal is supplied to, e.g., an external device such as a personal computer.

<Viterbi Decoding Processing Involving Optimization of Reproduction Processing Parameters According to Present Invention>

Figure 3:
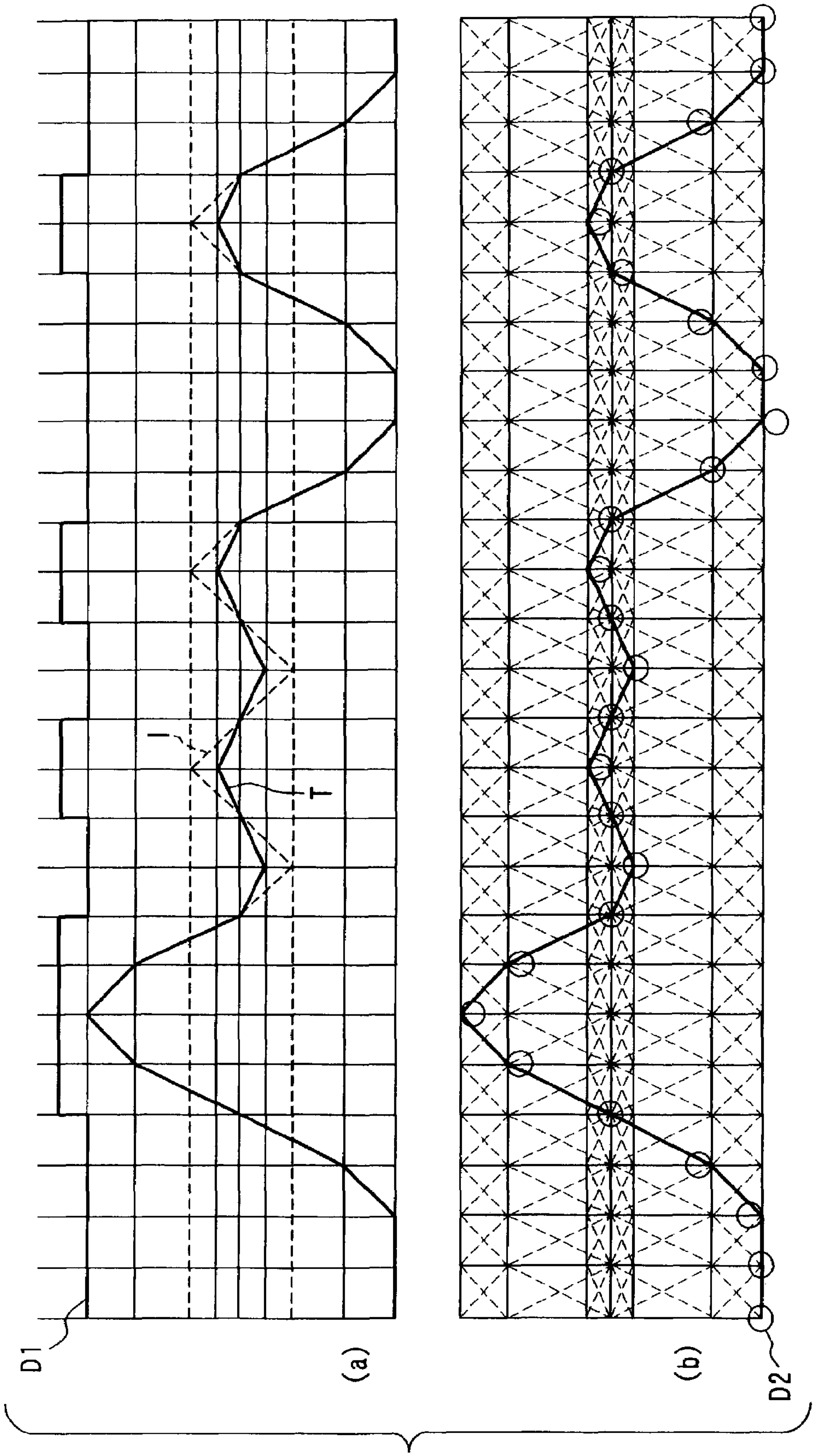
FIG. 3 is a graph showing an example of a judged bit series, a response waveform of PR (1, 2, 2, 1) and an actually measured waveform of the information reproducing device according to one embodiment of the present invention.
Figure 4:
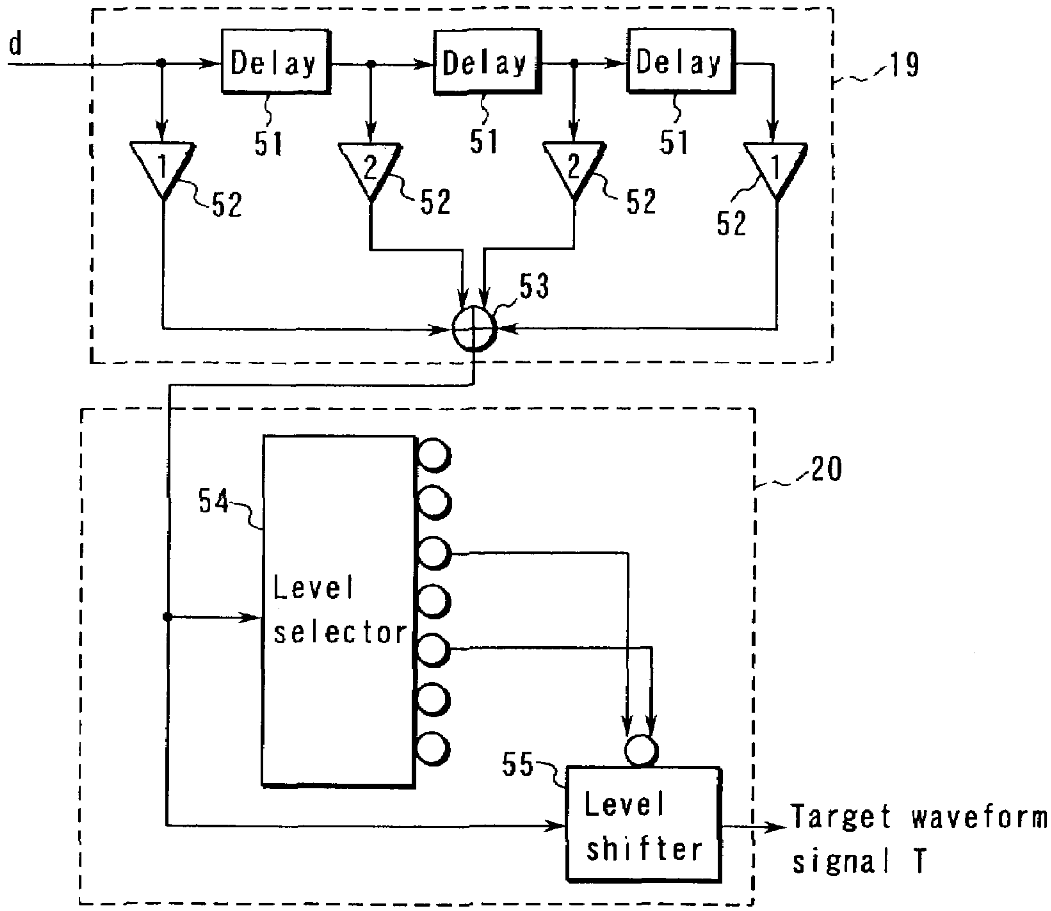
FIG. 4 is a block diagram showing a structure of an example of a target waveform generator of the information reproducing device according to one embodiment of the present invention.
Figure 6:
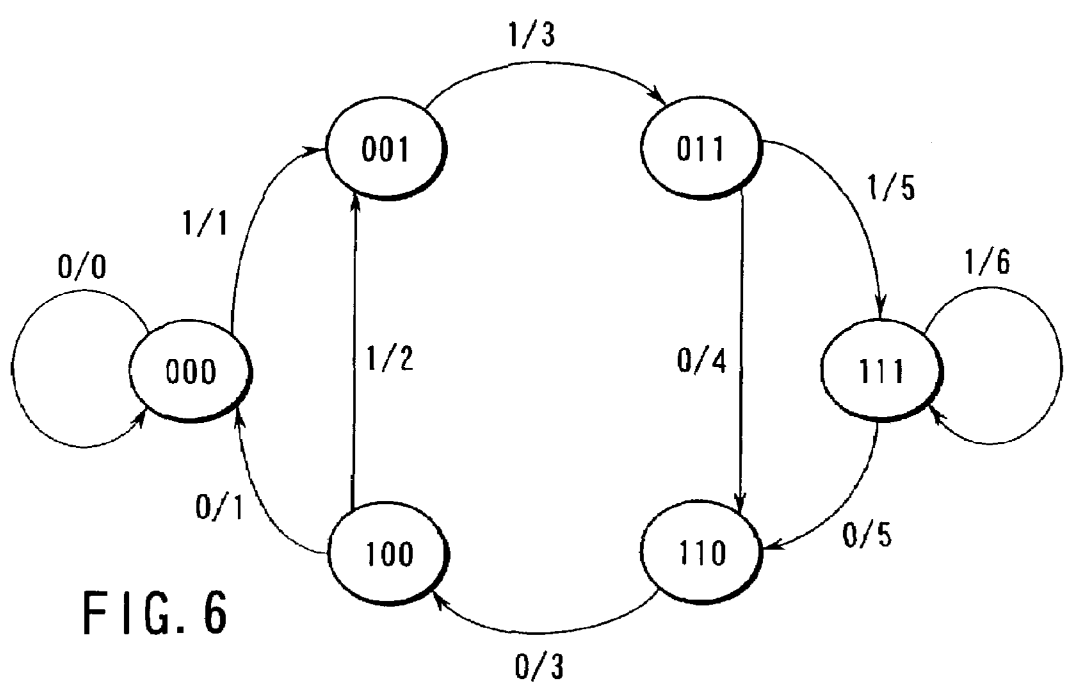
FIG. 6 is a view showing a state transition in a RLL modulation method and a PR (1, 2, 2, 1) ML decoding method of maximum likelihood decoding processing (1, 7) according to one embodiment of the present invention.
Figure 5:
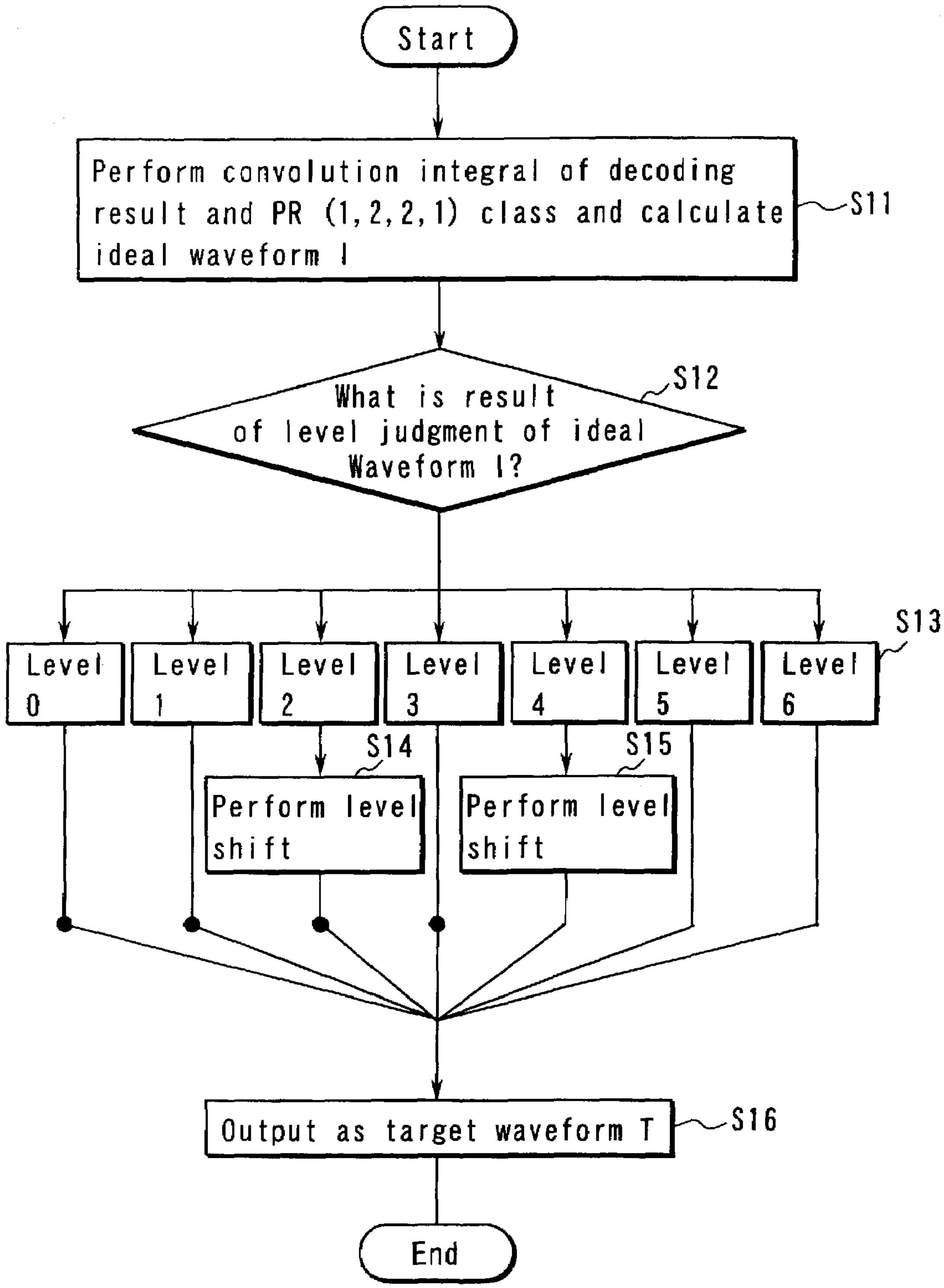
FIG. 5 is a flowchart showing an example of a target waveform generation method of the information reproducing device according to one embodiment of the present invention.
Figure 7:
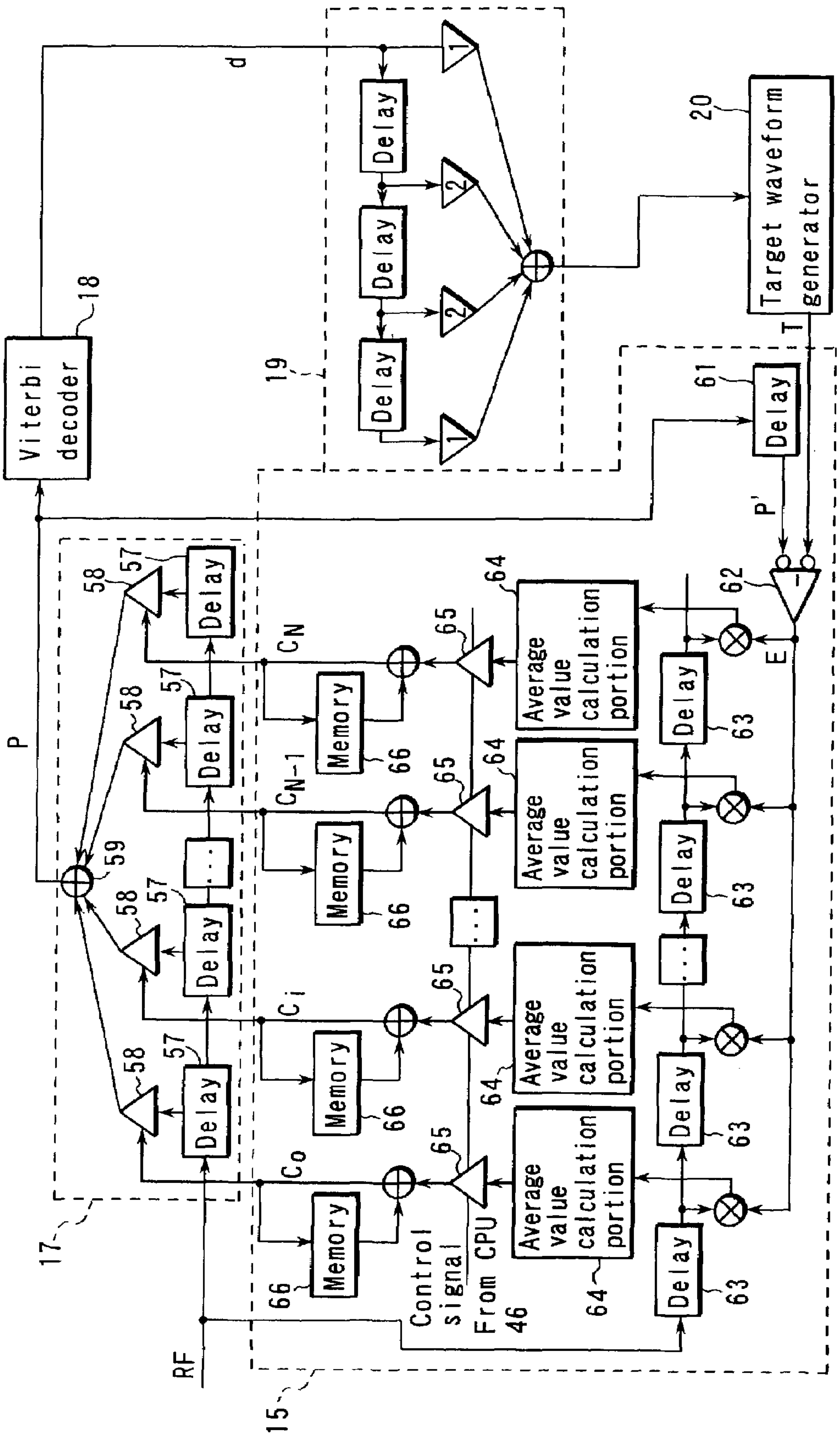
FIG. 7 is a block diagram for illustrating a method of determining tap coefficients of an FIR filter of the information reproducing device according to one embodiment of the present invention.
Figure 8:
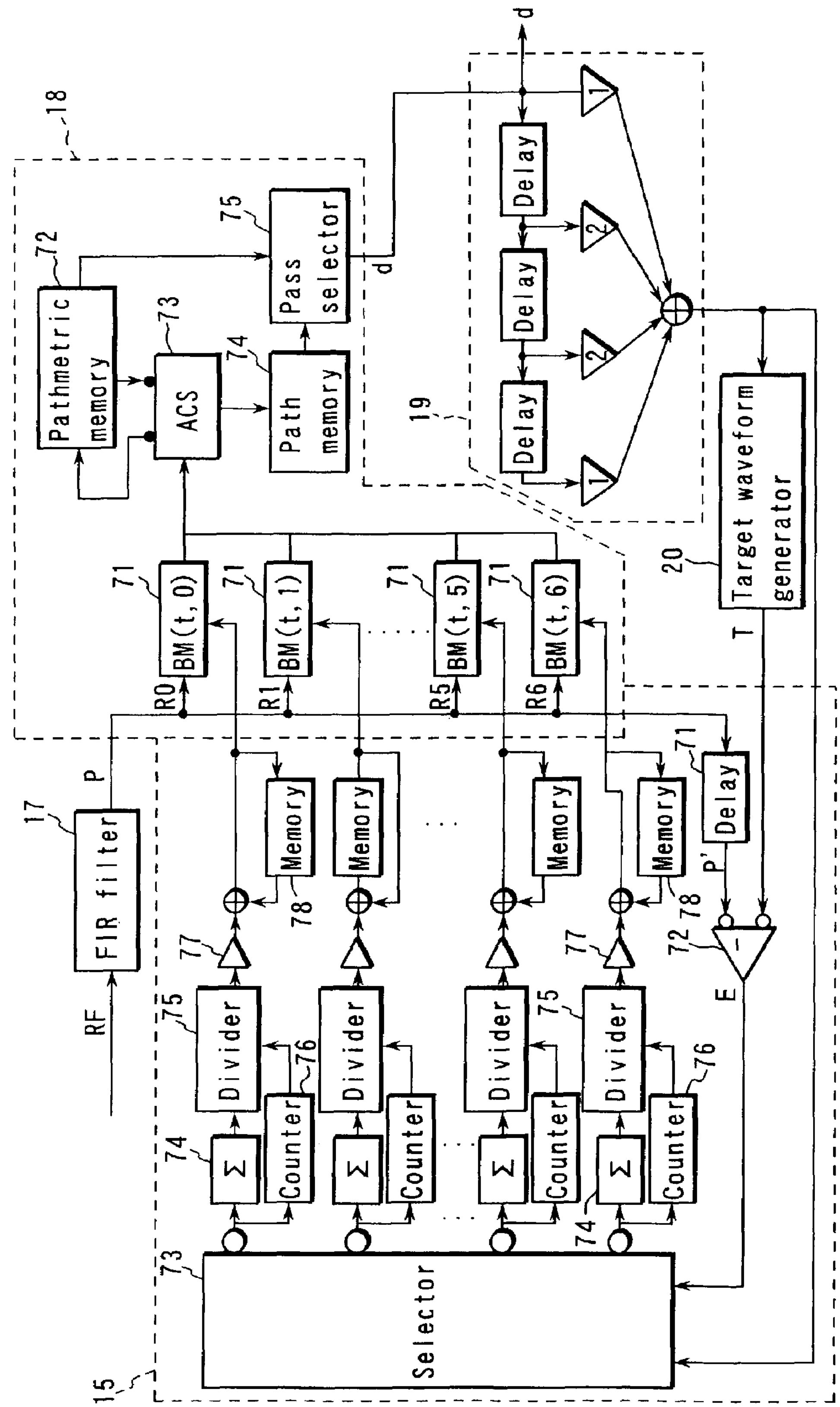
FIG. 8 is a block diagram for illustrating a method of determining Viterbi reference levels of the information reproducing device according to one embodiment of the present invention.

Optimization processing of reproduction processing parameters which is a characteristic of the present invention will now be described in detail hereinafter with reference to the accompanying drawings. FIG. 1 is a block diagram of an optical disk device which is a first embodiment according to one embodiment of the present invention; FIG. 3, a graph showing a judged bit series D1, a response waveform I of a PR (1, 2, 2, 1) and an example D2 of an actually measured waveform; FIG. 4, a block diagram showing a structure of an example of a target waveform generator; FIG. 5, a flowchart showing an example of a target waveform generation method of an information reproduction device according to one embodiment of the present invention; FIG. 7, a block diagram for illustrating a method of determining a tap coefficient of an FIR filter of the information reproducing device; FIG. 8 is a block diagram for illustrating a method of determining Viterbi reference levels; and FIG. 9, a block diagram for illustrating a method of controlling an AGC gain and an offset value.

A primary part of the information reproducing device according to one embodiment of the present invention shown in FIG. 1 illustrates a part of a structure of the data processing unit 1 and its periphery in FIG. 2. The description of the structure common to FIG. 2 is omitted, and only a structure inherent to FIG. 1 will be explained hereinafter. That is, the pick up head PUH has an object lens OL and drives it by an object lens actuator 11 upon receiving a drive signal from a servo block 13. The data processing unit 1 has an A/D converter 14 which converts a reproduction signal RF which has been detected from the pick up head PUH and transmitted through a pre-amplifier 12 into a digital signal, and further includes an AGC (Automatic Gain Controller) 16 which controls a gain or the like of the converter, an FIR filter 17 as a transversal filter which is connected to the AGC 16 and performs equalization processing, and a Viterbi decoder 18 which receives an equalization signal P from the FIR filter 17. Further, the data processing unit 1 has an ideal waveform generator 19 used to generate an ideal waveform signal I upon receiving a decoding signal d from the Viterbi decoder 18, a target waveform generator 20 which receives the ideal waveform signal I from the ideal waveform generator 19 and generates a target waveform signal T based on the received signal, and a parameter control portion 15 used to adapt reproduction processing parameters characteristic of the present invention based on the target waveform signal T, and it is subjected to the operation control by the CPU 46 shown in FIG. 1.

In this embodiment, the target waveform signal T including the non-linearity corresponding to the reproduction signal RF is defined from the ideal waveform signal T, and the reproduction processing parameters such as tap coefficients $C_0$ to $C_N$ of the FIR filter 17 are obtained based on the LMS algorithm by using a difference between the target waveform signal T and the reproduction equalization signal.

(Method of Generating Target Waveform Signal T)

A method of generating the target waveform signal T which is characteristic of the present invention will now be described hereinafter.

First of all, FIG. 4 shows structures of the ideal waveform generator 19 and the target waveform generator 20. The ideal waveform generator 19 has a plurality of delay circuits 51 which receive a decoding signal d from the Viterbi decoder 18, a plurality of amplifier circuits 52 provided to be connected to these delay circuits 51, and an adder 53 which receives outputs from these amplifier circuits 52.

Further, the target waveform generator 20 has a level selector 54 which receives an ideal waveform signal I from the ideal waveform generator 19, and a level shifter 55 which receives level signals of a level 2 and a level 4 corresponding to an amplitude of a shortest mark/space of the level sector 54, for example.

With such a structure, the ideal waveform generator 19 generates the ideal waveform signal I by the convolution integral of the decoding signal d from the Viterbi decoder 18 and a PR (1, 2, 2, 1) characteristic, and supplies it to the target waveform generator 20.

In the target waveform generator 20, the level sector 54 judges the level 2 and the level 4 corresponding to the amplitude of the shortest mark/space of the ideal waveform signal I. If it is determined that the ideal waveform signal I is on the level 2 and level 4, the level is changed in accordance with the later-described arithmetic expression in order to generate the target waveform signal T.

Here, a method of generating the target waveform signal T including the non-linearity corresponding to the reproduction signal RF will now be described in detail hereinafter in conjunction with a flowchart of FIG. 5. Description will be given on an example where the (1, 7) modulation method is used as a modulation method for data to be recorded and the PR (1, 2, 2, 1) ML decoding method is used as a decoding method. It is to be noted that the information recording/reproducing device using a combination of recorded data based on another modulation method and another decoding method also demonstrates the same effects and advantages within the scope of the present invention.

The decoding signal d is first supplied from the Viterbi decoder 18, and the convolution integral of this decoding signal d and the PR (1, 2, 2, 1) class is carried out, thereby generating the ideal waveform signal I (S11). The level judgment of the ideal waveform signal I is executed by the level selector 54 of the target waveform generator 20 (S12). Here, the ideal waveform signal I is divided into seven levels from the level 0 to the level 6 (S13). Among these levels, the level 2 and the level 4 correspond to the shortest mark/space 2T. 1T does not exist in the state transition drawing of the Viterbi decoder even if the amplitude corresponding to the shortest mark/space is small. Therefore, a bit error is not generated even if the amplitude is one close to the level 3.

As shown in (a) in a graph of FIG. 3, the target waveform signal T is generated from the ideal waveform signal I (signal D1 is a corresponding original data bit). That is, in (a) of FIG. 3, with respect to the levels corresponding to the level 2 and the level 4 in the ideal waveform signal I (a solid line and a broken line), the level of the target waveform signal T is changed to the level 3 side, and the target waveform signal T (solid line) is generated (S14, S15). That is, the waveform of the level corresponding to the shortest mark/space is changed so as to be close to the center of the ideal waveform, thereby generating the target waveform signal T.

Representing this processing by numerical expressions, the following expressions can be obtained:

$$Lv\mathbf{12}'=Lv\mathbf{12}+\alpha(Lv\mathbf{13}-Lv\mathbf{12})$$

$$Lv\mathbf{14}'=Lv\mathbf{14}-\alpha(Lv\mathbf{14}-Lv\mathbf{13})$$

Lv12' and Lv14' denote levels corresponding to the shortest mark/space of the target waveform signal T, and Lv12 and Lv14 designate levels corresponding to the shortest mark/space of the ideal waveform signal I. Here, $\alpha$ is a coefficient satisfying $0 \leqq \alpha \leqq 1$. In this manner, the target waveform signal T is generated and outputted (S16). Furthermore, (b) in FIG. 3 shows an actually measured waveform D2.

(Method of Controlling Reproduction Processing Parameters)

Description will now be given as to a method of controlling reproduction processing parameters by using the thus obtained target waveform signal T obtained as described above.

1. Method of Controlling Tap Coefficients of FIR Filter

A method of controlling the FIR filter 17 using the target waveform signal T will now be described. Here, description will be given as to a case where the FIR filter is a filter having seven taps and respective tap coefficients are $C_0$ to $C_6$ for the simplicity.

A parameter control portion 15 performs the control of reproduction processing parameters which is characteristic of the present invention and, as shown in FIG. 7, it has a difference circuit 62 which receives the target waveform signal T from the target waveform generation portion 20 and receives an output from the delay circuit 61 which accepts an equalization signal P from the FIR filter 17, and average value calculation portions 64 corresponding to the number of lines which receive synthetic signals of the reproduction signals RF delayed by a plurality of delay circuits 63 which gradually delay outputs from the difference circuit 62 and calculate average values of the received signals. Moreover, it has amplifier circuits 65 corresponding to the number of lines which respectively receive control signals from the CPU 46 and amplify them, and memories 66 corresponding to the number of lines which receive outputs from the amplifier circuits 65 as tap coefficients $C_0$ to $C_N$ corresponding to the number of lines and store them.

In addition, as shown in FIG. 7, the FIR filter 17 receives the tap coefficients $C_0$ to $C_N$ from the delay circuits 57 corresponding to the number of lines which receive the reproduction signals RF and sequentially apply predetermined delay to them and the parameter control portion 15, adequately amplifies the delayed reproduction signals FF in accordance with these coefficients, adds them in the adder, and outputs an equalization signal P.

In these structures, the difference circuit 62 outputs a difference between the target waveform signal T supplied from the target waveform generator 20 and the equalization signal P obtained by taking a delay time generated in the Viterbi decoder 18 and the target waveform generator 20 into consideration, namely, an equalization error signal E. Subsequently, the correlation between the equalization error signal E and the input signal with an arithmetic delay being taken into consideration is taken, and an average value of the correlation is calculated by each average value calculation portion 64. The control sensitivity is applied to the calculation result by the amplifier circuit 65 in accordance with the control signal from the CPU 46, and new tap coefficients $C_0$ to $C_N$ are calculated and stored in the memories 66, respectively.

The tap coefficients $C_0$ to $C_N$ adapted by the target waveform signal T are respectively supplied to the amplifier circuits 58 of the FIR filter 17. In the FIR filter 17, the Viterbi decoding processing with decoding errors greatly reduced as compared with the prior art device is enabled by applying the equalization processing to the reproduction signals RF based on the optimized tap coefficients $C_0$ to $C_N$.

2. Method of Controlling Viterbi Reference Level

Description will now be given as to a method of controlling Viterbi reference levels $R_0$ to $R_6$ using the target waveform signal T.

The parameter control portion 15 controls the reproduction processing parameters characteristic of the present invention and, as shown in FIG. 8, it has a difference circuit 72 which receives a target waveform signal T from the target waveform generation portion 20 and receives an output P' from a delay circuit 71 which accepts the equalization signal P from the FIR filter, and a selector 73 which receives an output E from the difference circuit 72 and the ideal waveform signal I from the ideal waveform generation portion 19. In addition, it has a plurality of accumulators 74 and counters 76 which are connected to outputs of the selector 73 corresponding to the level number, and correspond to the level number. Additionally, dividers 75 to which outputs of the accumulators 74 are connected are provided, and outputs from the counters 76 are supplied to these dividers 75. Further, outputs from the dividers 75 are supplied to amplifier circuits 77 and connected to memories 78 corresponding to the level number.

Furthermore, the Viterbi decoder 18 has a branch metric circuits (Branch Metric) 71 corresponding to the level numbers, their outputs are supplied to an ACS circuit (Add Compare Selector) 73, and an output from the ACS circuit 73 is a pathmetric memory (Pathmetric Memory) 72. This output is supplied to a pass selector (Pass Selector) 75 and, on the other hand, an output from the ACS circuit 73 is supplied to the pass selector 75 through a path memory (Path Memory) 74, thereby obtaining a decoding signal d.

In such a configuration, an equalization error E is first obtained as with the method of controlling the tap coefficients of the FIR filter 17. Then, the selector 73 is operated in accordance with a value of the ideal waveform signal I corresponding to the reference level judged by the Viterbi decoder 18, and the accumulator 74 and the counter circuit 75 provided in accordance with each reference level are used to calculate an average value of the equalization error on each judged reference level. Then, the control sensitivity is applied by the amplifier circuit 77, and the optimized reference levels $R_0$ to $R_6$ are calculated.

In the Viterbi decoder 18, the branch metric circuit 71 obtains a difference of the supplied equalization signal P based on the reference levels $R_0$ to $R_6$ optimized in accordance with the target waveform signal T. The obtained difference signal is supplied to the ACS circuit 73, and the decoding signal d of the supplied equalization signal P is obtained by the pass selector 75 through the pathmetric memory 72 and the path memory 74.

As described above, the present invention enables reproduction of information with decoding errors greatly reduced as compared with the prior art device by performing Viterbi decoding processing based on the reference levels $R_0$ to $R_6$ optimized by using the target waveform signal T.

3. Method of Controlling AGC Gain and Offset Value

Description will now be given as to a method of controlling an AGC gain and an offset value using the target waveform signal T.

Figure 9:
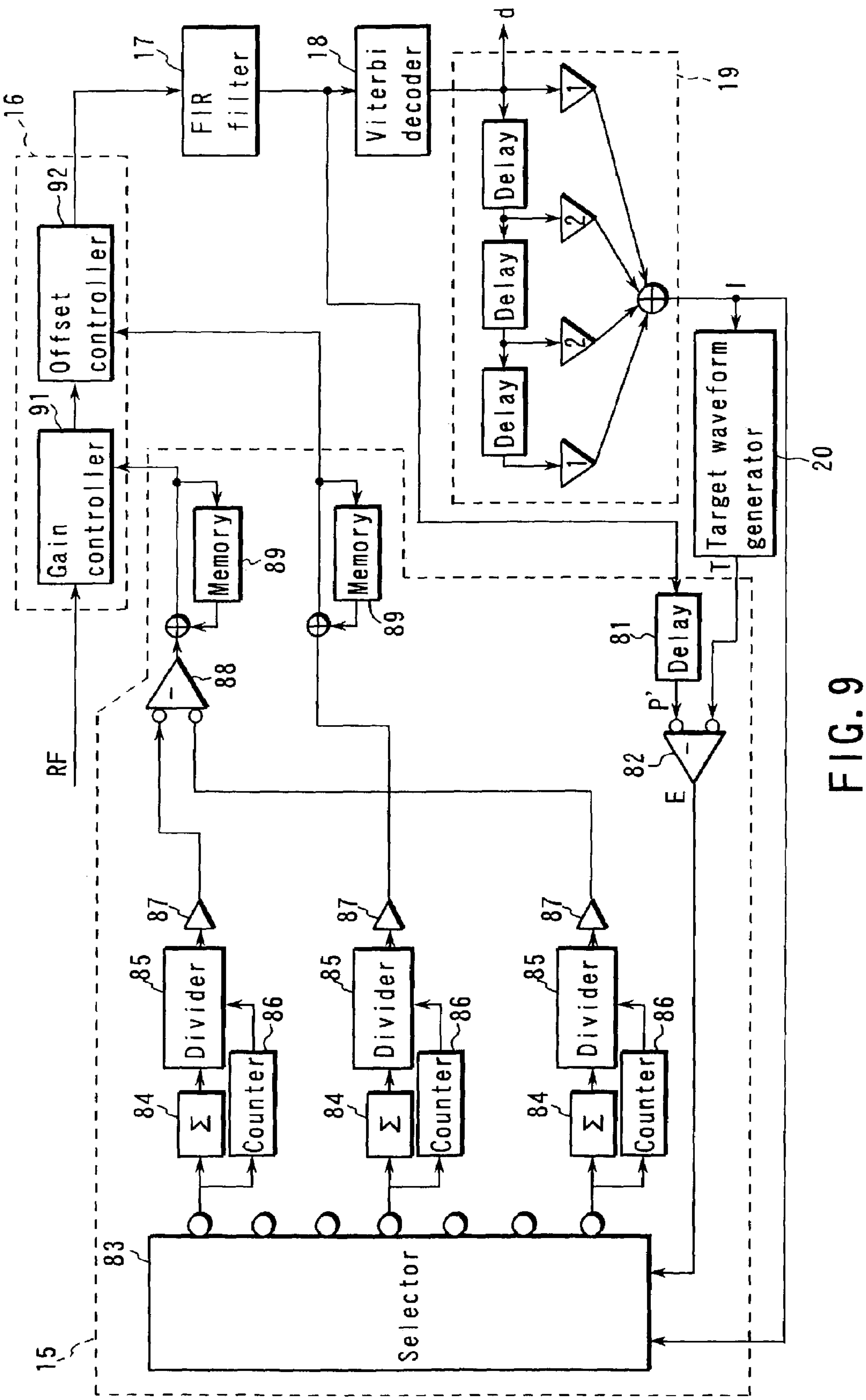
FIG. 9 is a block diagram for illustrating a method of controlling an ACG gain and an offset value of the information reproducing device according to one embodiment of the present invention.

A parameter control portion 15 controls reproduction processing parameters characteristic of the present invention and, as shown in FIG. 9, it has a difference circuit 82 which receives the target waveform signal T from the target waveform generation portion 20 and receives an output from a delay circuit 81 which accepts the equalization signal P from the FIR filter 17, and a selector 83 which receives an output E from the difference circuit 82 and the ideal waveform signal I from the ideal waveform generation portion 19. Furthermore, it has a plurality of accumulators 84 and counters 86 which are connected to outputs of a level 0, a level 3 and a level 6 of the selector 83. Moreover, there are provided dividers 85 to which outputs of the accumulators 84 are connected, and outputs from the counters 86 are supplied to the dividers 85. In addition, outputs from the dividers 85 are supplied to amplifier circuits 87, and there is a difference circuit 88 which receives an output from the amplifier circuit 87 on the level 0 and an output from the amplifier 87 on the level 6. Additionally, there are a memory 89 which receives an output from the difference circuit 88 and a memory 89 which receives an output from the amplifier circuit 87 on the level 3.

Further, an AGC circuit 16 automatically supplies an adequate gain, an offset value and the like and at least has a gain controller 91 which receives the reproduction signal RF and an offset controller 92 which receives an output from the gain controller 91. Furthermore, a gain G stored in the memory 89 connected to the difference circuit 88 corresponding to the level 0 and the level 6 is supplied to the gain controller 91, and an offset value F stored in the memory 89 corresponding to the level 3 is supplied to the offset controller 92.

In such a structure, like the method of controlling the Viterbi reference level, the equalization error E is first obtained. Then, the selector 83 is operated in accordance with a value of the ideal waveform signal I corresponding to the reference level judged by the Viterbi decoder 18, and an average value of the equalization error E according to each reference level is obtained by the accumulators 84, the dividers 85 and the counters 86. In the respective reference levels, as to the gain G, a difference in average value of the two equalization errors is calculated by the difference circuit 88 by using a maximum value and a minimum value of the reference levels, namely, the equalization errors of the level 0 and the level 6, a new gain G is calculated and optimized by applying the control sensitivity by the amplifier circuit 87, and this is stored in the memory 89.

Moreover, the offset value F is optimized as a new offset value F by applying the control sensitivity to a central value of the reference levels, namely, the average value of the equalization errors on the level 3 with the similar procedures, and this is stored in the memory 89. In each control, the control sensitivity is controlled by the CPU 46, and such a value that a control value can be sufficiently converged is selected.

The optimized gain G and offset value F are respectively supplied to the gain controller 91 and the offset controller 92, and the gain control and the offset control corresponding to the target waveform signal T are executed.

As described above, according to one embodiment of the present invention, since the reproduction signal RF is adapted based on the gain G and the offset value F optimized by using the target waveform signal T, information with decoding errors greatly reduced as compared with the prior art device can be reproduced in the following Viterbi decoding processing.

As described above in detail, in the information reproducing device according to one embodiment of the present invention, even if the linearity is lost due to formation of a small shortest mark/space, the target waveform signal T is generated, and at least the reproduction processing parameters such as ① the tap coefficients of the FIR filter, ② the reference levels of Viterbi decoding, ③ the gain and the offset value of the AGC circuit and others are optimized. As a result, in the Viterbi decoding processing, there are provided the information reproducing device and the information reproducing method which can reproduce information with decoding errors greatly reduced as compared with the prior art device.

<Second Embodiment>

A second embodiment provides an information reproducing device and an information reproducing method when changing not only levels corresponding to the shortest mark/space of the ideal waveform but also all the levels in case of obtaining the target waveform signal T.

Figure 10:
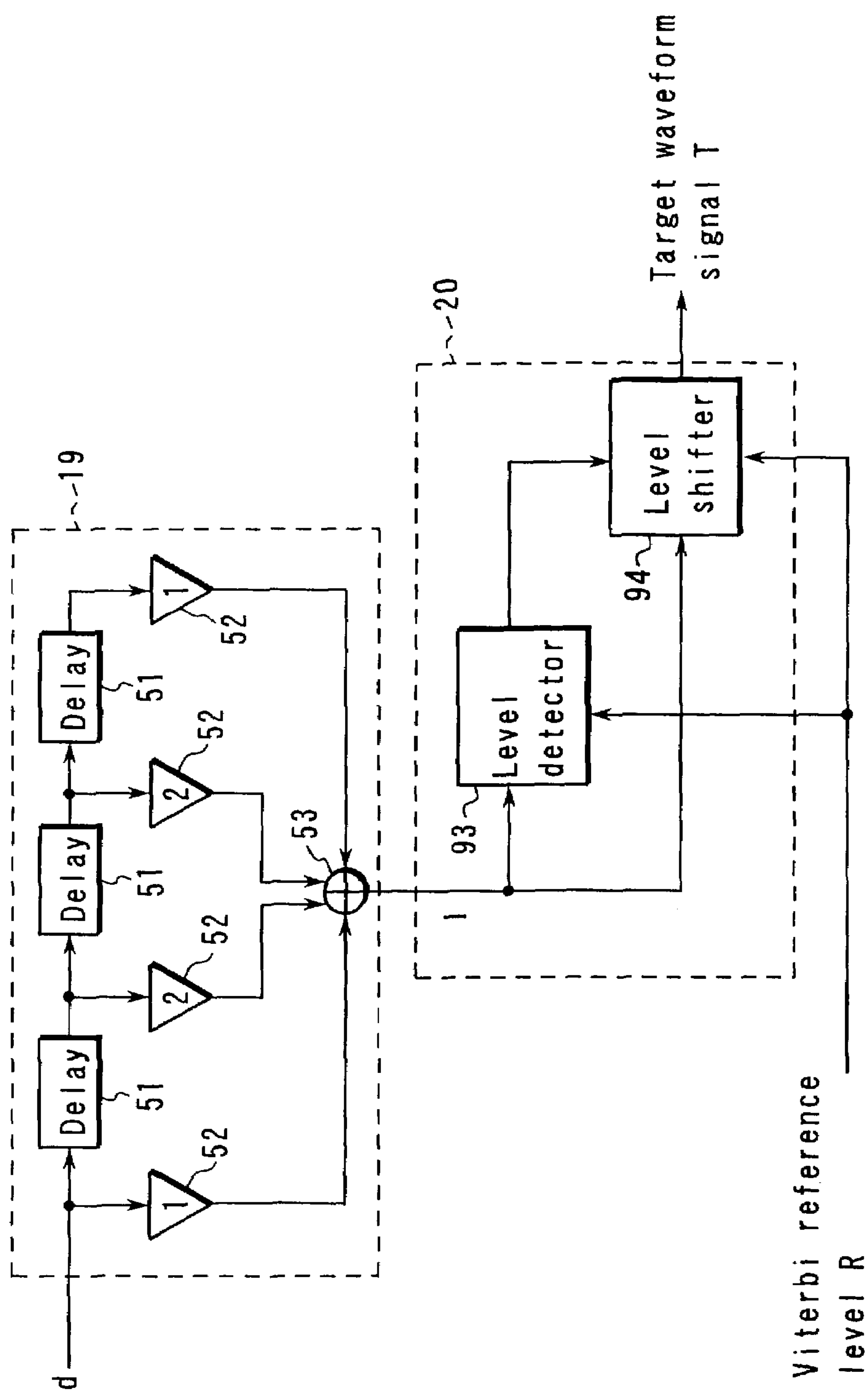
FIG. 10 is a block diagram showing an example of a target waveform generator of an information reproducing device according to a second embodiment of the present invention.
Figure 11:
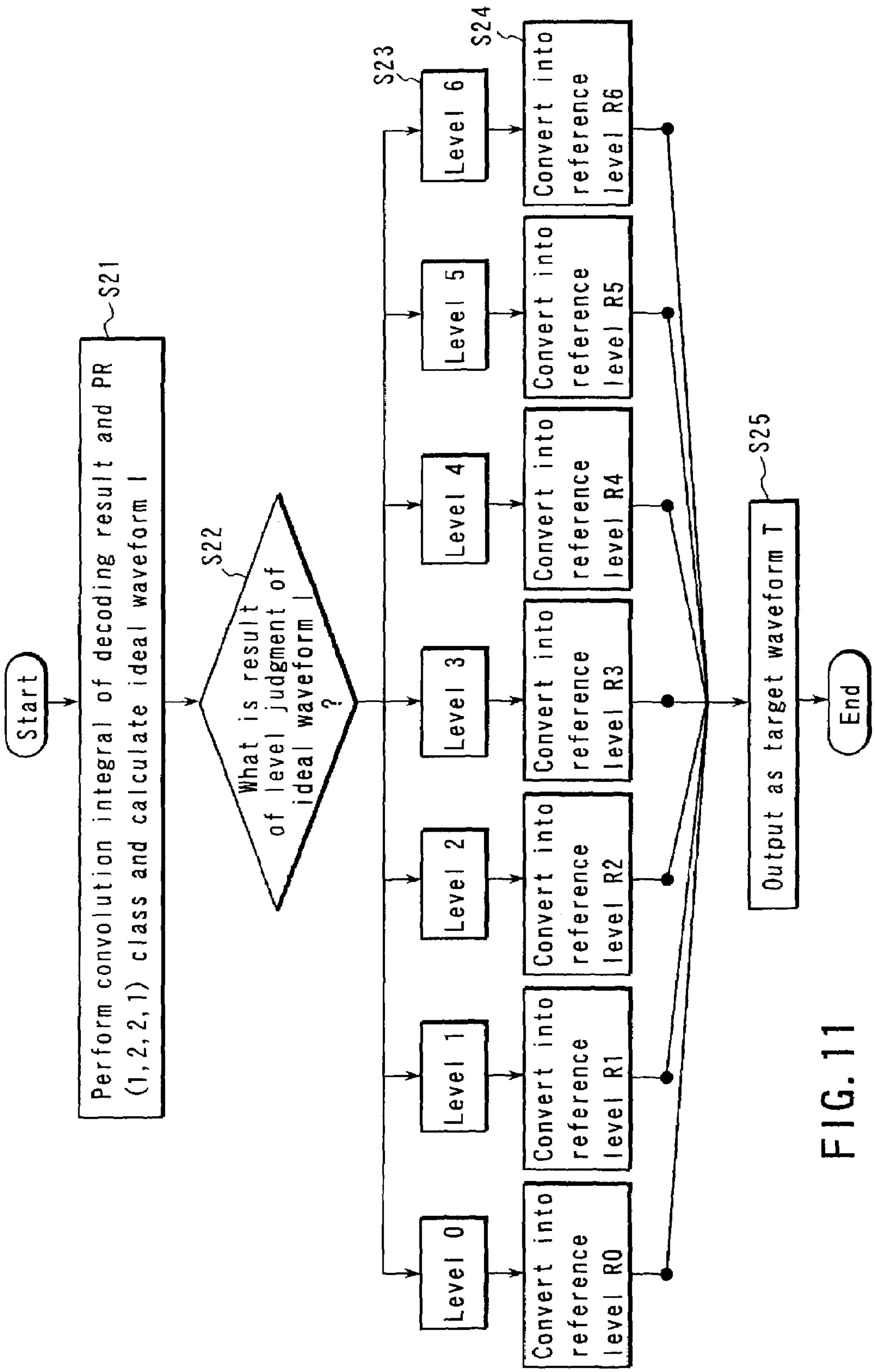
FIG. 11 is a flowchart showing an example of a target waveform generation method of the information reproducing device according to the second embodiment of the present invention.

FIG. 10 is a block diagram showing an example of the target waveform generator of the information reproducing device according to the second embodiment of the present invention, and FIG. 11 is a flowchart showing an example of the target waveform generation method of the information reproducing device according to the second embodiment of the present invention.

In FIG. 10, the ideal waveform generator 19 is the same as that in FIG. 4, thereby omitting the explanation. A target waveform generator 20 which receives the ideal waveform signal I from an ideal waveform generator 19 has a level detector 93 to which Viterbi reference levels $R_0$ to $R_6$ and the ideal waveform signal I are supplied, and a level shifter 94 to which the Viterbi reference levels $R_0$ to $R_6$, the ideal waveform signal I and a detection signal from the level detector 93 are supplied.

In such a structure, the procedures of generating the target waveform signal T according to the second embodiment will now be described hereinafter with reference to a flowchart of FIG. 11. The explanation will be given as to a case where the (1, 7) RLL modulation method is used as the modulation method for data to be recorded and the PR (1, 2, 2, 1) decoding method is used as the decoding method for the simplicity. This is also equivalent in the information recording/reproducing device using a combination of recorded data based on another modulation method or another decoding method within the scope of the present invention.

At first, the decoding signal d is supplied from the Viterbi decoder 18, and the convolution integral of the decoding signal d and the PR (1, 2, 2, 1) class is performed by functions of a plurality of delay circuits 51, a plurality of amplifier circuits 52 and the adder 53, thereby generating the ideal waveform signal I (S21). Then, the level judgment of the ideal waveform signal I is performed by the level detector 93 of the target waveform generator 20 (S22). Here, the ideal waveform signal I is divided into seven levels from level 0 to level 6 (S23). The level shifter 94 converts the signal levels of the ideal waveform signal I into reference levels $R_0$ to $R_6$ Of the Viterbi decoder in accordance with the judged level, respectively.

In the second embodiment, as described above, the target waveform signal T is converted into the reference level $R_0$ to $R_6$ of the Viterbi decoder in all the levels. By obtaining such a target waveform signal T, the optimum control value can be supplied to the Viterbi decoder 18 even if the linearity is lost due to formation of a small shortest mark/space. Moreover, the similar advantages can be demonstrated in reproduction of data which is asymmetry because optimization of the conditions in recording is insufficient.

<Third Embodiment>

A third embodiment provides the case of giving predetermined conditions to the reproduction processing parameters in order to stabilize the operations of the AGC, the FIR filter, the Viterbi decoder and the adaptation control.

That is, the third embodiment at least ① determines a total value of the tap coefficients $C_0$ to $C_6$ of the FIR filter as 1 and ② optimizes the reference levels $R_0$ to $R_N$ of the Viterbi decoder 18 while fixing a value of the minimum reference level $R_0$ and a value of the maximum reference level $R_N$ in order to stabilize the operation of each adaptation control when adapting the reproduction processing parameters in accordance with the target waveform signal T as described above.

(Problems)

In the first embodiment, when optimization of the gain using the AGC circuit 16 according to the target waveform signal T is performed concurrently with optimization of the tap coefficients $C_0$ to $C_6$ of the FIR filter 17 or optimization of the reference levels $R_0$ to $R_N$ of the Viterbi decoder, the gain which should have been optimized unnecessarily varies due to a change in the tap coefficients $C_0$ to $C_6$ or the reference levels $R_0$ to $R_N$ of the Viterbi decoder. As a result, each adaptation control unstably operates, and the control system may diverge in the worst case.

(Tap Coefficients $C_0$ to $C_6$ of FIR Filter 17)

In optimization of the tap coefficients $C_0$ to $C_6$, unintentional fluctuations in the gain can be avoided by taking values of the tap coefficients $C_0$ to $C_6$ according to the target waveform signal T in such a manner that a total value of the tap coefficients $C_0$ to $C_6$ becomes 1.

Therefore, it is possible to provide the information recording device and the information recording method which can stably reproduce information recorded with the high density while maintaining the adequate gain by obtaining in the parameter control portion 15 such tap coefficients $C_0$ to $C_6$ corresponding to the target waveform signal T acquired in the above-described method as that their total value becomes 1 and performing the equalization processing by using the FIR filter 17 based on the tap coefficients $C_0$ to $C_6$.

(Maximum/minimum Reference Levels of Viterbi Decoder)

In case of optimizing the reference levels $R_0$ to $R_N$ Of the Viterbi decoder, unintentional fluctuations in the gain can be avoided by setting the reference levels $R_0$ and $R_N$ which are maximum and minimum reference levels as fixed values and then determining and using the reference levels $R_0$ to $R_N$ according to the target waveform signal T.

It is, therefore, possible to provide the information recording device and the information recording method which can stably reproduce information recorded with the high density while maintaining the adequate gain by adapting in the parameter control portion 15 the reference levels $R_0$ to $R_N$ corresponding to the target waveform signal T acquired by the above-described method other than the maximum/minimum reference levels without changing values of the maximum/minimum reference levels and performing the Viterbi decoding processing based on the reference levels $R_0$ to $R_N$.

According to the third embodiment, unintentional fluctuations in the gain can be avoided, stable reproduction of recorded information is enabled and the identification accuracy of recorded information can be greatly improved by controlling both or either the equalizer (FIR filter) and the Viterbi decoder which are required in the PRML signal processing under the conditions mentioned above.

Although a person skilled in the art can realize the present invention based on the above-described various embodiments, he/she can readily conceive various modifications of these embodiments and can apply to various embodiments without the inventive capability. The present invention, therefore, covers a wide range which is not inconsistent with the disclosed principle and the novel characteristics, and is not restricted to the foregoing embodiments.

As described above, according to one embodiment of the present invention, it is possible to provide the information reproducing device and the information reproducing method which can give the reproduction processing parameters optimum for the Viterbi decoder and stably reproduce information recorded with the high density even if the linearity is lost due to formation of a small shortest mark/space.

Further, the similar advantages can be demonstrated in reproduction of data which is asymmetric because optimization of the conditions in recording is insufficient.

What is claimed is:

1. An information reproducing device for reproducing information recorded on a storage medium, comprising:

a detecting section for detecting information recorded on a storage medium and outputting a detection signal;

a converting section for converting the detection signal outputted by the detecting section into a digital signal;

a correcting section for correcting the digital signal converted by the convening section in accordance with a parameter;

an equalizing section for applying partial response equalization processing to the corrected digital signal corrected by the correcting section based on a predetermined coefficient and outputting an equalization signal;

a maximum likelihood decoding section for applying maximum likelihood decoding processing to the equalization signal outputted by the equalizing section based on a reference level and outputting a decoding signal;

an ideal waveform generating section for generating and outputting an ideal waveform signal in accordance with the equalization signal outputted from the equalizing section;

a target waveform generating section that receives the ideal waveform signal from the ideal waveform generating section, judges the ideal waveform signal as one of level 0 to level 6, shifts a value of the ideal waveform signal when the ideal waveform signal is judged as level 2 or level 4, and generates the ideal waveform signal shifted or not shifted as a target waveform signal; and an optimizing section for calculating an error between the target waveform signal outputted by the target waveform generating section and the equalization signal outputted by the equalizing section, and optimizing at lease one of the parameter of the correcting section, the predetermined coefficient of the equalizing section and the reference level of the maximum likelihood decoding section in such a manner that the error becomes minimum.

2. The information reproducing device according to claim 1, wherein the optimizing section calculates the error between the target waveform signal outputted by the target waveform generating section and the equalization signal outputted by the equalizing section by LMS algorithm processing, and optimizes at least one of the parameter of the correcting section, the predetermined coefficient of the equalizing section and the reference level of the maximum likelihood decoding section in such a manner that the error becomes minimum.

3. The information reproducing device according to claim 1, wherein the optimizing section optimizes at least one of an amplitude and an offset of the digital signal in the correcting section in accordance with the parameter.

4. The information reproducing device according to claim 1, wherein the optimizing section calculates the error between the target waveform signal outputted by the target waveform generating section and the equalization signal outputted by the equalizing section, and optimizes a plurality of tap coefficients which are the predetermined coefficients used by the equalizing section in such a manner that the error becomes minimum.

5. The information reproducing device according to claim 1, wherein the optimizing section calculates the error between the target waveform signal outputted by the target waveform generating section and the equalization signal outputted by the equalizing section, and optimizes a plurality of reference levels of the maximum likelihood decoding processing of the maximum likelihood decoding section in such a manner that the error becomes minimum.

6. The information reproducing device according to claim 1, wherein the optimizing section optimizes a plurality of the predetermined coefficients when applying the partial response equalization processing to the corrected digital signal corrected by the correcting section without changing a gain of the equalizing section from a fixed value.

7. The information reproducing section according to claim 1, wherein the optimizing section optimizes a plurality of the predetermined coefficients while determining a value of a sum total of a plurality of the predetermined coefficients as 1 when applying the partial response equalization processing to the corrected digital signal corrected by the correcting section.

8. The information reproducing section according to claim 1, wherein the optimizing section optimizes the reference levels other than maximum and minimum reference levels in a plurality of the reference levels of the maximum likelihood decoding processing of the maximum likelihood decoding section without changing the maximum and minimum reference levels from fixed values.

9. An information reproducing method which reproduces information recorded on a storage medium, comprising:

a detection step of detecting information recorded on a storage medium and outputting a detection signal;

a conversion step of converting the detection signal outputted at the detection step into a digital signal;

a correction step of correcting the digital signal convened at the conversion step in accordance with a parameter;

an equalization step of applying partial response equalization processing to the corrected digital signal corrected at the correction step based on a predetermined coefficient;

a maximum likelihood decoding step of applying maximum likelihood decoding processing to the equalization signal outputted at the equalization step based on a reference level and outputting a decoding signal;

an ideal waveform generation step of generating and outputting an ideal waveform signal in accordance with the equalization signal outputted from the equalization step;

a target waveform generation step of receiving the ideal waveform signal judging the ideal waveform signal as one of level 0 to level 6, shifting a value of the ideal waveform signal when the ideal waveform signal is judged as level 2 or level 4, and generating the ideal waveform signal shifted or not shifted as a target waveform signal; and an optimization step of calculating an error between the target waveform signal outputted at the target waveform generation step and the equalization signal outputted at the equalization step and optimizing at least one of the parameter of the correction step, the predetermined coefficient of the equalization step and the reference level of the maximum likelihood decoding step in such a manner that the error becomes minimum.

10. The information reproducing method according to claim 9, wherein the optimization step calculates the error between the target waveform signal outputted at the target waveform generation step and the equalization signal outputted at the equalization step by LMS algorithm processing, and optimizes at least one of the parameter of the correction step, the predetermined coefficient of the equalization step and the reference level of the maximum likelihood decoding step in such a manner that the error becomes minimum.

11. The information reproducing method according to claim 9, wherein the optimization step optimizes at least one of an amplitude and an offset of the digital signal in the correction step in accordance with the parameter.

12. The information reproducing method according to claim 9, wherein the optimization step calculates the error between the target waveform signal outputted at the target waveform generation step and the equalization signal outputted at the equalization step, and optimizes a plurality of tap coefficients which are the predetermined coefficients used by the equalization step in such a manner that the error becomes minimum.

13. The information reproducing method according to claim 9, wherein the optimization step calculates the error between the target waveform signal outputted at the target waveform generation step and the equalization signal outputted at the equalization step, and optimizes a plurality of reference levels of the maximum likelihood decoding processing of the maximum likelihood decoding step in such a manner that the error becomes minimum.

14. The information reproducing method according to claim 9, wherein the target waveform generation step changes a level corresponding to a shortest mark/space in respective levels of the ideal waveform signal outputted at the ideal waveform generation step, and generates and outputs a target waveform signal which can be a target of the equalization step.

15. The information reproducing method according to claim 9, wherein the target waveform generation step changes a waveform of a level corresponding to a shortest mark/space in respective levels of the ideal waveform signal outputted at the ideal waveform generation step so as to be close to the center of the ideal waveform, and generates and outputs a target waveform signal which can be a target of the equalization step.

16. The information reproducing method according to claim 9, wherein the target waveform generation step changes waveforms of all of the respective levels of the ideal waveform signal outputted at the ideal waveform generation step, and generates and outputs a target waveform signal which can be a target of the equalization step.

17. The information reproducing method according to claim 9, wherein the optimization step optimizes a plurality of the predetermined coefficients when applying the partial response equalization processing to the corrected digital signal corrected at the correction step without changing a gain of the equalization step from a fixed value.

18. The information reproducing method according to claim 9, wherein the optimization step optimizes a plurality of the predetermined coefficients while determining a value of a sum total of a plurality of the predetermined coefficients as 1 when applying the partial response equalization processing to the corrected digital signal corrected at the correction step.

19. The information reproducing method according to claim 9, wherein the optimization step optimizes the reference levels other than maximum and minimum reference levels in a plurality of the reference levels of the maximum likelihood decoding processing at the maximum likelihood decoding step without changing the maximum and minimum reference levels from fixed values.

20. An information reproducing device for reproducing information recorded on a storage medium, comprising:

an equalization signal output section that applies partial response equalization processing to a signal produced based on the information recorded on the storage medium and outputs an equalization signal;

an ideal waveform output section that outputs an ideal waveform signal in accordance with the equalization signal outputted from the equalization signal output section;

a target waveform generating section that receives the ideal waveform signal from the ideal waveform output section, judges the ideal waveform signal as one of level 0 to level 6, shifts a value of the ideal waveform signal when the ideal waveform signal is judged as level 2 or level 4, and generates the ideal waveform signal shifted or not shifted as a target waveform signal; and an error calculating section for calculating an error between the target waveform signal outputted by the target waveform generating section and the equalization signal outputted by the equalization signal output section.

* * * * *